United States Patent
Blazy

(10) Patent No.: US 11,241,846 B2
(45) Date of Patent: Feb. 8, 2022

(54) SIMULATED FIGURE PANELS

(71) Applicant: John Blazy, Cleveland, OH (US)

(72) Inventor: John Blazy, Cleveland, OH (US)

( * ) Notice: Subject to any disclaimer, the term of this patent is extended or adjusted under 35 U.S.C. 154(b) by 578 days.

(21) Appl. No.: 16/048,814

(22) Filed: Jul. 30, 2018

(65) Prior Publication Data

US 2019/0030837 A1 Jan. 31, 2019

Related U.S. Application Data

(60) Provisional application No. 62/538,110, filed on Jul. 28, 2017.

(51) Int. Cl.

| | |
|---|---|
| B29C 70/46 | (2006.01) |
| B32B 5/02 | (2006.01) |
| B32B 5/26 | (2006.01) |
| B32B 37/10 | (2006.01) |
| B32B 37/18 | (2006.01) |
| B32B 38/10 | (2006.01) |
| B44F 9/02 | (2006.01) |
| B29C 70/20 | (2006.01) |
| B44C 5/04 | (2006.01) |
| B29C 70/54 | (2006.01) |
| B29L 7/00 | (2006.01) |

(52) U.S. Cl.
CPC .............. B29C 70/46 (2013.01); B29C 70/20 (2013.01); B29C 70/545 (2013.01); B32B 5/022 (2013.01); B32B 5/26 (2013.01); B32B 37/10 (2013.01); B32B 37/182 (2013.01); B32B 38/10 (2013.01); B44C 5/0453 (2013.01); B44F 9/02 (2013.01); *B29L 2007/002* (2013.01); *B32B 2250/20* (2013.01); *B32B 2255/02* (2013.01); *B32B 2255/26* (2013.01); *B32B 2305/076* (2013.01); *B32B 2305/20* (2013.01); *B32B 2451/00* (2013.01); *B32B 2607/00* (2013.01)

(58) Field of Classification Search
None
See application file for complete search history.

(56) References Cited

U.S. PATENT DOCUMENTS

| | | | | |
|---|---|---|---|---|
| 2,655,978 A | * | 10/1953 | Hodge | B29C 53/26 156/201 |
| 4,657,717 A | * | 4/1987 | Cattanach | B29C 43/3642 264/102 |

FOREIGN PATENT DOCUMENTS

DE          102012218711 A1 *  4/2014  ............. B32B 38/12

OTHER PUBLICATIONS

Translation of DE 10 2012 218 711 (Year: 2014).*

* cited by examiner

*Primary Examiner* — Marc C Howell
*Assistant Examiner* — John J DeRusso
(74) *Attorney, Agent, or Firm* — Tucker Ellis LLP; Michael G. Craig

(57) ABSTRACT

One or more techniques and/or systems are disclosed for creating panels to simulate the real light tracing ability of wood fibers, and the light refractive properties of real wood figure. High light refractive man-made fibers can be molded into 3D figured panels which may then be filled with clear resin to magnify and to duplicate the light refractivity of wood figure. A protective backing material can be applied to the rear of the molded fiber panel, to provide a flat surface, and/or for adherence purposes. Rather, the 3D figured panels may also be machined into flat fiber panels to reveal a visual 3D surface that simulates the light refractivity of wood figure.

11 Claims, 9 Drawing Sheets

SIMULATED FIGURE PANELS

CROSS-REFERENCE TO RELATED APPLICATIONS

This application claims priority to U.S. Provisional Patent Application Ser. No. 62/538,110, entitled SIMULATED FIGURE PANELS, filed Jul. 28, 2017, which is incorporated herein by reference.

BACKGROUND

Currently, in order to simulate the light refractive properties of real wood figure in an architectural panel, multi-layer pressed wood veneer panels are created that utilize real wood veneer molded to form refractive wood figure. Many architectural panels, veneers, and surfacing products achieve simulated wood grain, light tracing, or light refractive properties of real wood by printing photos of wood, or reconstituting wood veneers, then re-slicing into useable veneer, or pressing veneer laminations into "figured" molds, and re-slicing into veneer sheets.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, one or more techniques and systems that create panels to simulate the real light tracing ability of wood fibers, and the light refractive properties of real wood figure. The techniques and systems use high light refractive man-made fibers that are molded into 3D figured panels which may be filled with clear resin or finished as solid stock panels to magnify and to duplicate the light refractivity of wood figure, or which may be finished as solid stock panels. For example, the panels can be made for aesthetic reasons. These types of panels can duplicate the light refraction of wood figure using fiber that is originally designed for structural reinforcement.

In one implementation of making of light refractive fiber panels, a single layer unidirectional fiber core is molded into a three-dimensional shape. Further, in this implementation, a clear resin top-coat is applied to a face of the resulting molded fiber core. Additionally, in this implementation, the backing material is applied to a rear of the molded fiber core.

In another implementation of making light refractive fiber panels, a multi-layer unidirectional fiber core is molded into a three-dimensional shape. Further, in this implementation, the molded three-dimensional panel may be machined to a flat fiber panel. Additionally, in this implementation, optional layers of exotic material may be interleaved between the multiple layers of unidirectional fiber to achieve desired aesthetics.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
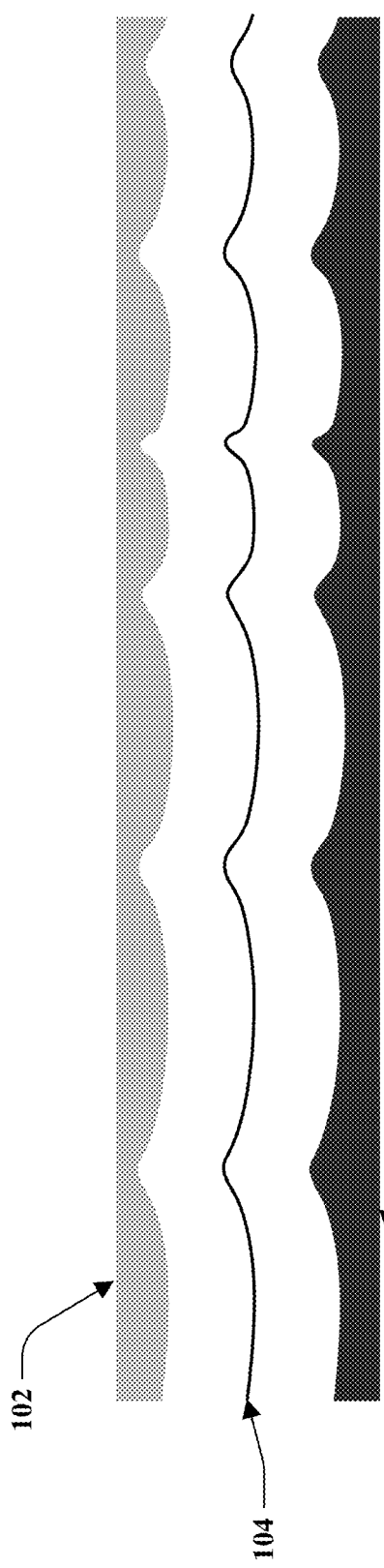
FIG. 1 is a component diagram illustrating an example implementation of a product resulting from one or more techniques and systems described herein.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Wood figure is different from wood species, wood grain, wood color, and the like. Wood figure is a name given to any wood species in which the grain does not run in straight fiber orientation. Slight variation in fiber direction from perfectly straight is common, but heavy figure refers to fibers that are significantly not straight, and in directions that are curled, waved, quilted, knurled or burled, etc., for example. This type of fiber orientation allows the grain to refract light in a 3D effect (e.g., chatoyance) following this abnormal grain direction. For example, the core visual effect of wood figure can be due to light tracing along the elongated linear shape of wood fibers within which stacked wood cells have the ability to reflect and refract light in such a way that the light reflection off the cell sides tend to follow and trace the linear direction of the fiber-like cell. Bundles of stacked wood cells form wood fibers, and compose the bulk of wood structure.

In one aspect, this type of light reflection off the cell sides that tend to follow and visually trace the linear direction of the fiber-like cell can be described as light tracing for example. Light tracing can provide for certain natural and man-made fibers to have the ability to trace light along its length and trace the shape of the fiber orientation. Wood is the most common source for oriented fiber light tracing, but techniques and systems described herein illustrate how certain man-made fiber products like carbon fiber, glass fiber, synthetic fiber and Aramid fiber may be used to allow a simulated, and possibly more pronounced, light tracing ability.

Highly figured wood can carry high value in the market, for example, particularly for those with the 3D visual effect. In one implementation, disclosed herein, a panel-like product that simulates the visual grain-like patterns of wood figure using man-made fibers can be devised, along with manufacturing methods for creating the same. Further, as disclosed herein, a system and techniques can be devised for using light tracing fiber panels molded into alternate 3D patterns/textures, other than wood figure shapes, such as geometric repeating patterns, wave patterns, etc.

In one implementation, a method may be utilized to produce the light tracing components, such as panels. In this implementation, a single layer core, for example, a thin (e.g., 0.006 inches to 0.20 inches), unidirectional fiber sheet that has been molded into a topographic 3D texture/pattern can be used. In this implementation, the thickness of the core may increase in overall thickness by 5 to 100 times through a molding process, depending on an amount of visual depth desired.

In another implementation, a multi-layer core, for example, a thick (e.g., 0.040 inches to 2.50 inches), unidirectional fiber sheet stack can be molded into a topographic 3D texture/pattern. In this implementation, the thickness of the core may increase in overall thickness by 1.1 to 2.5 times through a molding process, depending on the amount of visual depth desired. Further, this multi-layer core can be machined to produce a flat fiber surface for visual effect, ease of cleaning, mounting of hardware, etc.

In one alternate implementation, a clear top fill "lensing" resin can be applied. For example, various clear resins may be poured, molded, or otherwise applied over the top viewing face of the 3D fiber core layer in order to magnify the visual depth ("lensing") of the 3D texture, and to provide for utilitarian use by making the top surface flat for visual effect, ease of cleaning, mounting of hardware, etc.

In another alternate implementation, a back filling resin may be applied. For example, in this optional step, the back of the 3D core layer can be filled to provide a flat surface for visual cleanliness, adhesive bonding to a substrate, for maintaining uniform thickness, and/or foundational for hardware mounting. In this implementation, the back filling resin may be clear, opaque, and/or colored/tinted.

In one alternate implementation, one or more aesthetic material layers may be applied. For example, various exotic materials may be interleaved between multiple layers of unidirectional fiber layer (e.g., core layers) that are used in the multi-layer core. In this example, application of these materials may provide a desired aesthetic appearance by adding color, patterns, or increasing refractive properties of the fiber core. The optional material layers may contour to the shape of the 3D mold, and bond to the fiber core. Further, for example, a colored or clear resin may be applied between layers of the exotic materials and unidirectional fiber layers. In this way, for example, additional visual effects can be obtained for the resulting product.

In one implementation, the core of the panel product can comprise the shaped/molded unidirectional fiber core layer (e.g., either single layer or multi-layer). For example, typical fiber core layers are described as bi- or multi directional fiber woven cloth that are used for structural reinforcement in resin composites; however, in one implementation, the visual effect for these techniques can be created using the unidirectional fiber (e.g., not woven) core creation techniques, described herein. That is, for example, a molded/shaped, unidirectional fiber core may be applied over a typical woven cloth fiber panel to generate a desired visual effect over a reinforced panel.

In one implementation, the unidirectional fibers can be molded to 3D textures in and beneath the viewing plane for aesthetic, decorative surfacing. As an example, the viewing plane describes the flat, parallel planes of face and back. In one or more implementations, the fiber direction is disposed in an "off parallel" direction of this plane, for example, intentionally molded into curvaceous directions (e.g., 3D mold) not parallel to the viewing plane. Most existing decorative uses of fiber composites are flat, and are parallel to the viewing plane (e.g., whether woven or unidirectional) even if the whole plane is contoured to 3D shapes, in which the fibers are still parallel to viewing plane, but the fibers are structured to follow the contour of the shape. The techniques and systems described herein utilize a 3D texture that intentionally deviates from the viewing plane.

In one implementation, a raw, core sheet of unidirectional fiber, either single layer or multi-layer, can comprise any suitable fiber material in which the fibers exhibit reflective light tracing properties. These types of fibers include, but are not limited to: carbon fiber, synthetic plastic/polypropylene fiber, PET fiber, aluminized glass fiber (Texalium), aramid fiber, and natural fibers like flax or actual wood veneer itself. In this implementation, the fiber core can be (e.g., either singly or with resins) molded into a heavily textured panel with molds under pressure, heat (e.g., optional, depending on the resin) and time, and is fixedly set into the shape of the mold.

Further, the resulting shaped visual core panel is by itself a unique, marketable rigid panel that can be clear coated and applied to surfaces for decoration, as it carries the visual 3D effect from the mold. In one implementation, the molds used to generate the 3D cores can be created from hand drawn images, computer generated images, photographs, or other media, and selected for the desired visual effect. In one implementation, the resulting shaped visual core panel can be augmented by filling the face (e.g., viewing face) with resins, filling the back with resins, and/or laminating clear structural panels like glass, PET or acrylic to its face with their respective laminating resins for added "lensing" effect, and utility.

In one implementation, when filling the molded depressions in the face of the molded fiber core panel with epoxy or other clear resins and/or laminating clear sheet over these resins, this panel becomes more aesthetically pleasing, and has greater utility with the resulting flat face. This resulting flat face can magnify the depth of the texture with a "lens" effect, adds structural rigidity, and allows practical utility like ease of cleaning, fastener bonding, etc. Additionally, improved utility is gained when filling the back of the panel with resins/fillers for thickness consistency, adhesive bonding, fastener structure, and aesthetics when viewed from behind.

In another implementation, a multi-layer unidirectional fiber core may be shaped though a 3D molding process and machined flat to reveal a visual 3D effect. The 3D visual effect of the flat surface of the multi-layer fiber may resemble desired light tracing characteristics (e.g., chatoyance) of wood figure.

Further, in this implementation, multiple layers of unidirectional fiber may be "pre-bonded" together and cut to a desired size. Unidirectional fiber layers may be pre-impregnated with thermally affected epoxy that is partially cured. Pre-impregnated unidirectional fiber (e.g., "prepreg") may be desirable to hold the layers of fiber together during various processes (e.g., "pre-bonding"). The layers of unidirectional fiber may be stacked and "pre-bonded" together using machinery (e.g., pinch roller press, etc.). The machinery may be used to press multiple unidirectional fiber layers together to achieve a fiber core of a desired thickness (i.e., greater number of fiber panels are "pre-bonded" to achieve greater thickness). For example, fifteen layers of unidirectional fiber may be "pre-bonded" together to form a "pre-bonded" ⅛ inch thick stack of fiber layers that may result in a 1/16 inch finalized fiber panel. In another example, forty to eighty layers of unidirectional fiber layers may be "pre-bonded" together to form ⅛ inch to 3/16 inch finalized fiber panel. The multi-layer "pre-bonded" stack of fiber layers may be wrapped in a containment sleeve (e.g., polyethylene terephthalate (PET) release liner, etc.) to prevent undesired movement of the fiber during the molding process. Although the containment sleeve may be desirable, it may be omitted in other instances (e.g., if using high tolerance four-sided mold).

Figure 7:
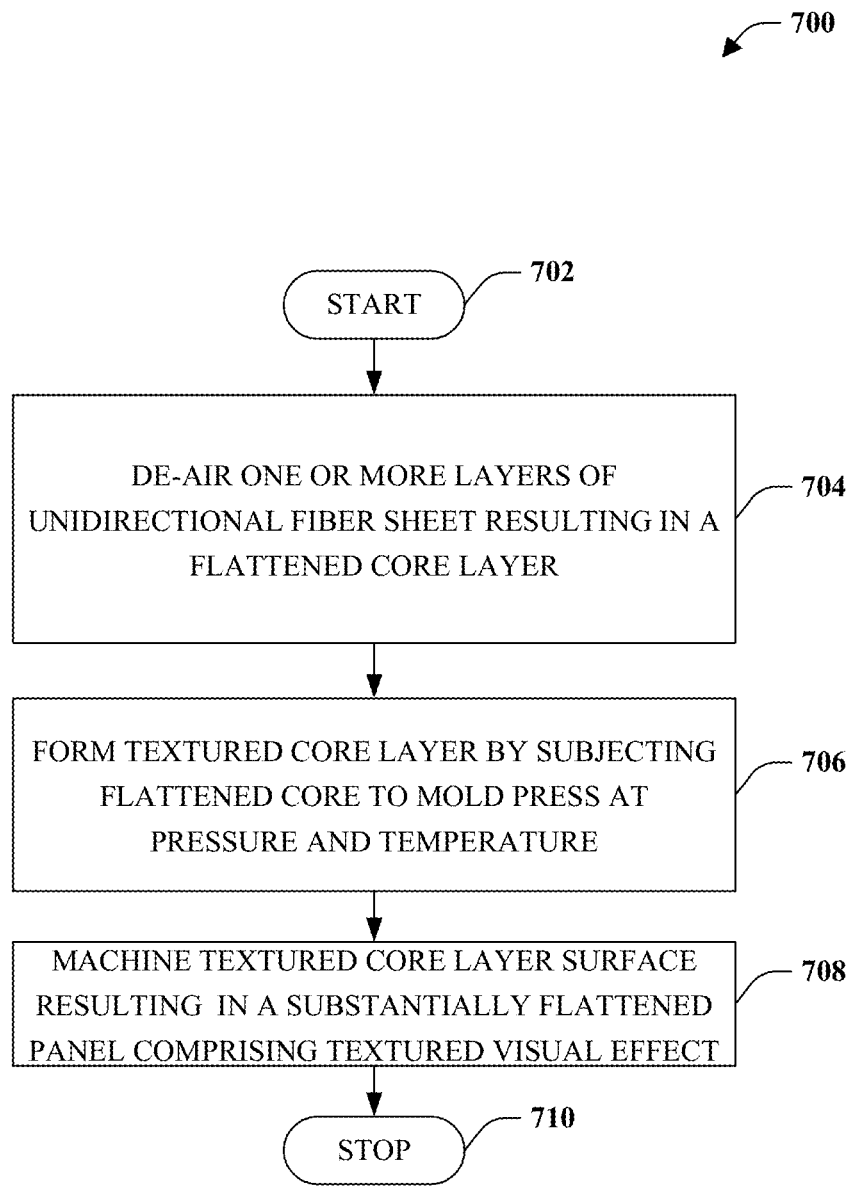
FIG. 7 is a flow diagram illustrating one example method where one or more techniques described herein may be implemented.
Figure 8:
FIGS. 8-12 are illustrative implementations of one or more products resulting from one or more systems and techniques described herein.
Figure 9:
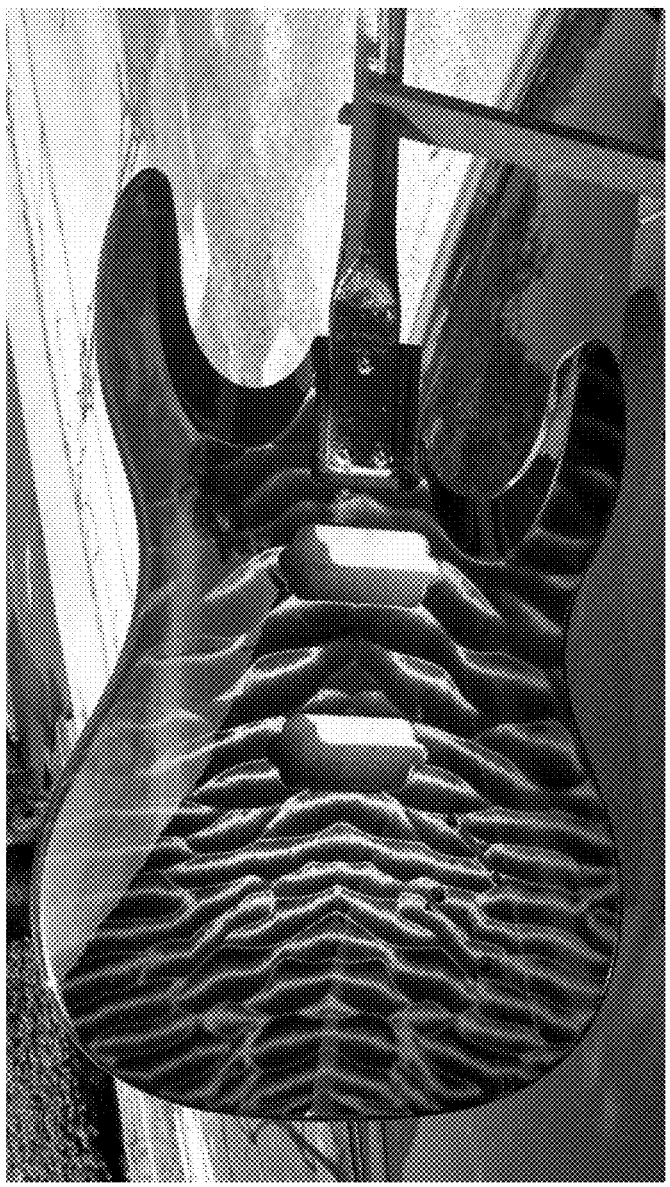
Figure 10:
Figure 11:
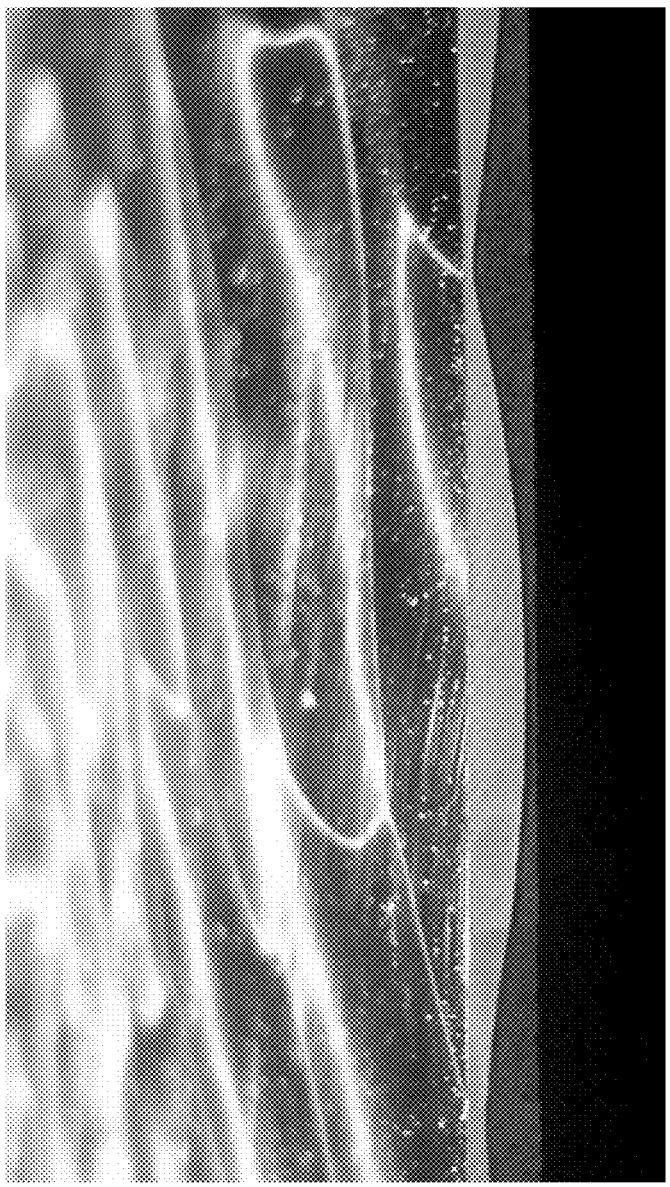
Figure 12:
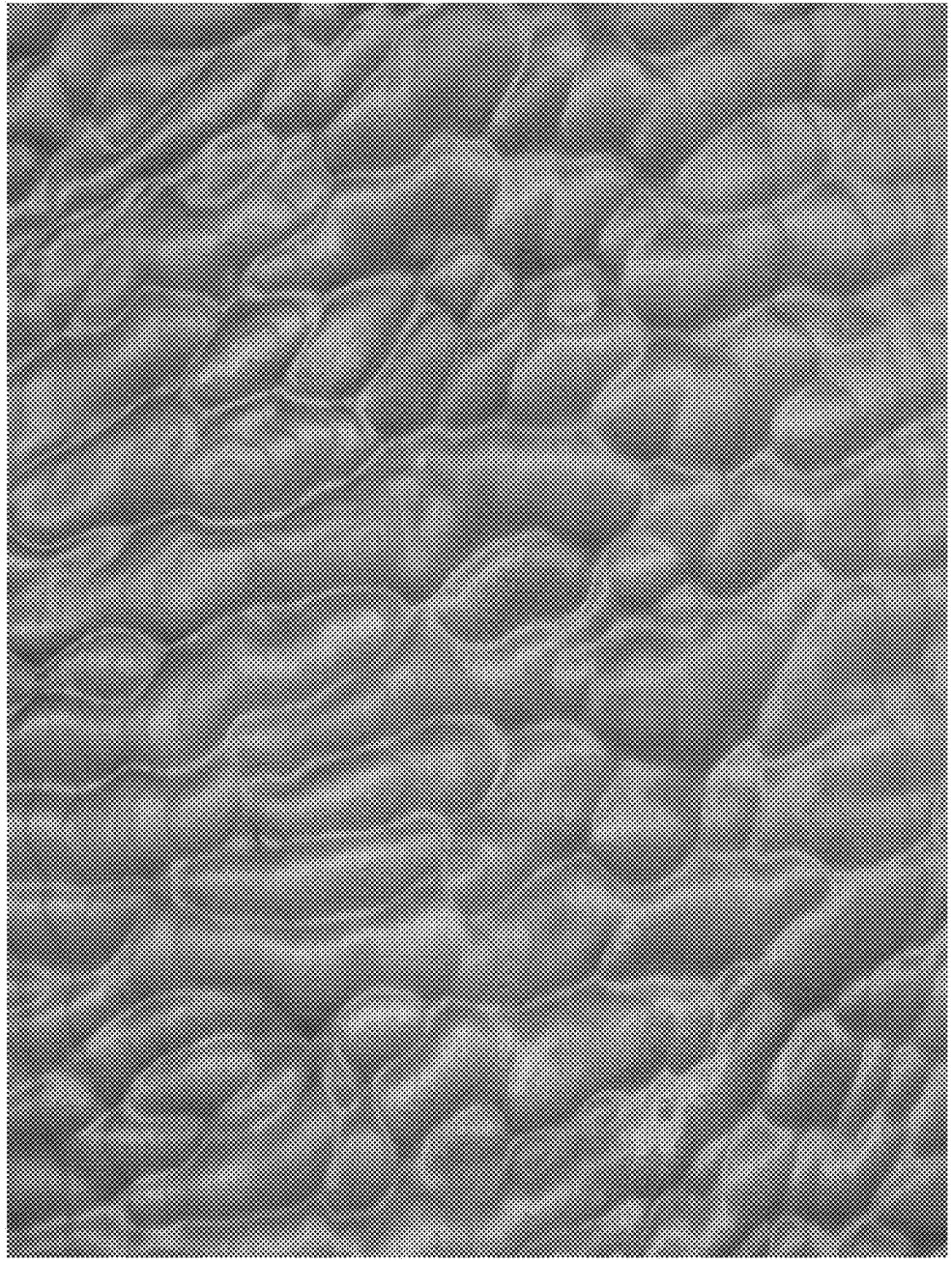

FIG. 7 is a flow diagram illustrating an example method 700 where one or more techniques described herein may be implemented. The example method begins at 702. At 704, one or more layers of unidirectional fiber sheet can be de-aired, such by placing in a flat press, resulting in a flattened, and de-aired core layer. In this implementation, after this step, the flattened core layer may comprise one or more pre-impregnated (e.g., with resin), flexible sheet that are still relatively malleable. At 706, the flattened core layer can be subjected to a texturizing mold press at temperature and pressure, resulting in a texturized core layer, for example, in a cured condition. That is, for example, the texturized core layer may be cured by the temperature and pressure, such as a result of a temperature sensitive resin, resulting in a hardened core layer. At 708, the texturized core layer can be machined to produce a substantially flat surface, such as at the face comprising a texturized visual effect. Having produced the flat faced core layer with the visual effect, the example, method 700 ends at 710.

As an illustrative example, in one implementation, the stack of unidirectional fiber layers, enclosed in a containment sleeve, may be compressed at a temperature and pressure to help remove air between the fiber layers (e.g., a de-airing step). In this implementation, the stack of unidirectional fiber layers may be placed between flat plates (e.g., "de-airing" plates) and pressure may be applied to the plates/fiber layers in an outward direction starting from the middle of the plates/fiber layers. The direction of pressure may help remove air that may be present between the layers of the unidirectional fiber. In one implementation, the pressure may be applied through individually threaded rods that may apply pressure at specific points (e.g., not in a uniform manner as done in hydraulic presses). In one example, the stack of unidirectional fiber layers may be compressed between flat plates at 3000 pounds per square foot for ten to thirty minutes at 80° C. to create a substantially flat, semi-cured stack of unidirectional fiber layers.

In one implementation, the semi-cured stack of unidirectional fiber layers may be shaped using a 3D mold. In one implementation, the 3D mold can comprise a silicone "male" side and a hard "female" side; however, other materials may be used for the molding process. The semi-cured stack may be pressed at a temperature and pressure to form a fully cured fiber panel with a desired 3D shape. in one implementation, pressure may be applied to the mold/fiber layers in an outward direction starting from the middle of the mold/fiber layers to prevent air between layers, for example; Alternately, pressure may be applied in a uniform manner. In one example, the stack of unidirectional fiber layers may be compressed between a top and bottom of the 3D mold for 1.5 to 2 hours at 130° C. to 150° C. In this example, the 3D molding process may result in a fully cured fiber panel comprising an uneven surface texture. This process may result in an increased thickness (e.g., depth) of the fiber core of 1.1 to 2.5 times. Further, for example, the fully cured fiber core may be smaller in dimension (e.g., length and width) compared to the semi-cured state as a result of the creation of the topographic surface.

In one implementation, the fully cured fiber panel can be finished by machining to produce a panel of a desired shape and surface texture. For example, the fully cured fiber panel with topographic 3D surface may be shaped (e.g., using a suitable tool, such as a diamond blade, etc.) into a desired geometric shape (e.g., polygon, circle, amorphous shape) and surfaced (e.g., with a planer, abrasive drum, or abrasive belt, etc.) to produce a desired surface, such as a flat surface or partially textured, on the top and bottom of the fiber panel. In this implementation, the machined fiber panel may reveal a visual 3D effect (e.g., chatoyance) that may resemble wood figure of real wood fiber, for example, depending on the mold used to form the panel. As an example, the machined fiber panel may possess desirable qualities (e.g., hardness, improved density, sheen, etc.) without additional finishing. However, if desired, the machined fiber panel can be finished further (e.g., sanding, polishing, laminating, etc.) to produce different results that may be aesthetically pleasing, for example.

As an example, the desired simulation of real wood figure created by the techniques described herein, such as by molding the core fiber layer using molds, may be designed and made to simulate real wood figure based on the mold used. For example, natural, random variations can be applied, providing for the resulting visual effect, as provided by the techniques and systems described herein. In alternate implementations, molds can be used that are not based on real or natural wood figure design, but rather any desired pattern/texture, such as dune ripples, geometric shapes, linear patterns, repeating wave patterns, etc. to make 3D simulated texture panels for other visual effects.

For example, using alternate core layers, other than or along with fiber, such as sprayed metallic or borosilicate or other pigment effects to trace the 3D texture made by the mold's patterns, can provide for alternate results. For example, metallic pigments that trace the texture similarly to the fiber, but in scattered light patterns, not linear light tracing, may be utilized. As another example, alternate core materials can be used that light trace in different ways, such as satin fabric. Although woven, the fabric can make a unique lustrous 3D light trace similar to real woven quilt upholstery, for example. Further, as another alternate example, actual wood veneer can be used for added authenticity to simulated figure. In this example, the wood veneer used can be unidirectional, and not known to produce a certain figure like quilted (e.g., only maple, mahogany, and sapele produce quilt figure), and the molding process can bend and alter the direction of the wood veneer fiber orientation to create a 3D figure effect like quilted walnut, for example.

Other alternate implementations can include using metallic and dichroic films to trace and reflect the 3D texture. For example, metallized PET films or color-shifting dichroic films may be used. As another example, sheets of rigid transparent panels, such as glass, acrylic, PET, or other clear panels, can be used and bonded to the face of the resin filled cavities in the molded 3D surface. As another example, the molded core panel may be used by itself, without filling the textured cavities in the 3D face, thereby saving production costs yet still having a unique, lustrous panel that light traces its texture for decorative effect by itself without the added "lensing" effect of resin fill.

In one implementation, multiple alternate layers may be interleaved between multiple fiber layers to trace the 3D texture made by the molds. In this implementation, a pattern of alternate layers and fiber layers may be repeated to achieve a desired thickness or aesthetic effect. For example, a pattern of alternate layers may comprise a layer of carbon, a layer of black epoxy, a color layer, and a clear layer. As another example, a pattern of alternate layers may comprise a layer of carbon, a layer of epoxy, a layer of colored tint, and a layer of shellac. It can be appreciated that any pattern of any number of alternate layers may be interleaved with fiber layers to achieve various aesthetic results, for example. Additionally, an alternate material layer may comprise exotic material (e.g., colored epoxy, multi-layer epoxy films, precious metal foils, crystal embedded films, metallized films, dichroic films, etc.) that may add different colors or change refractive properties, for example.

FIG. 1 is a component diagram illustrating an example implementation of a product resulting from one or more techniques and systems described herein. In this example, the core fiber layer may be the base component of the product, and it can be molded using a single layer of unidirectional fiber (e.g., carbon, aramid, etc.). In this example, the fiber core 104 may be molded into the 3D shape of the mold, under an appropriate pressure and temperature. In one implementation, a silicone "male" side 102 is pressed against a hard "female" side 106 to shape the fiber core 104.

Figure 2:
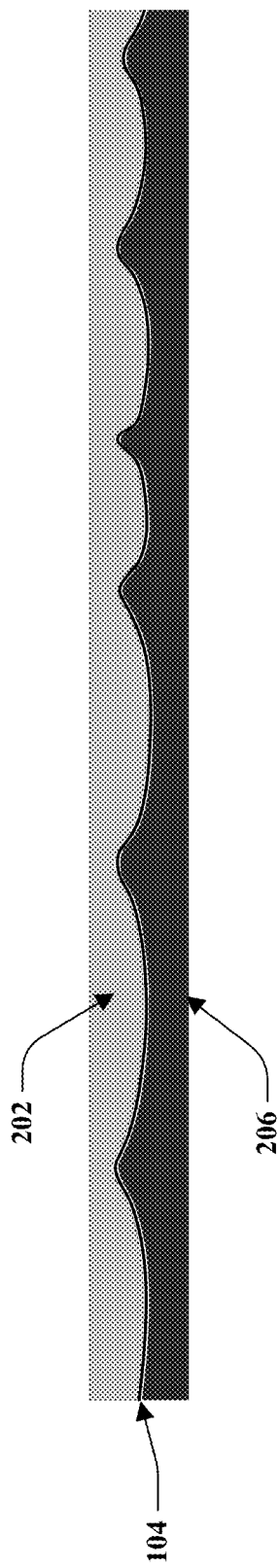
FIG. 2 is a component diagram illustrating an example implementation of a product resulting from one or more techniques and systems described herein.

FIG. 2 is a component diagram of an example implementation of a product resulting from one or more techniques and systems described herein. In this implementation, optionally, a clear, moldable resin 202 (e.g., epoxy, acrylic casting resin, EVA, urethane, etc.) can be applied over the molded core 104, resulting in a clear covering. For example, the clear resin covering 202 can allow for a lensing effect of the clear resin to magnify the depth of the wood figure in the grain. Optionally, a simple clear coat (e.g., lacquer, 2k urethane, oil, etc.) can be applied to the molded fiber core 104, to allow for the figured effect of the textured fiber core 104. As an example, the unidirectional fiber material of the fiber core 104 (e.g., carbon fiber, aramid bier, polyester fiber, etc.) can provide for a light refraction that simulates wood fiber. A backing filler 206, which is optional, can add a flatness (e.g., or other desired texture) to the back texture of the molded core 104. This may allow for improved adhesion, bonding, and for decorative filling. For example, the backing filler can be rigid or flexible urethane foam, FRP, felt, or other moldable resin/fiber composite that functions as an inexpensive filler/protective backing.

Figure 3:
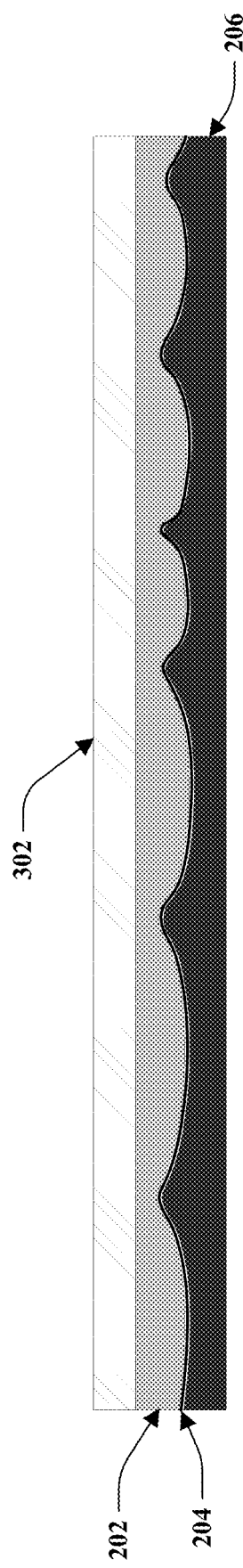
FIG. 3 is a component diagram illustrating an example implementation of a product resulting from one or more techniques and systems described herein.

FIG. 3 is a component diagram illustrating an example implementation of a product resulting from one or more techniques and systems described herein. In one implementation, a clear cap sheet 302 can be applied. The clear cap sheet 302 can comprise rigid glass, plastic, PET, or other acrylic that bonds to the laminating resin, bonding to the surface of the covering 202. For example, this can create a durable and aesthetic surface to laminate while still allowing for the lensing effect of the clear covering 202, and may magnify the figure of the wood grain in the molded fiber core 104.

Figure 4:
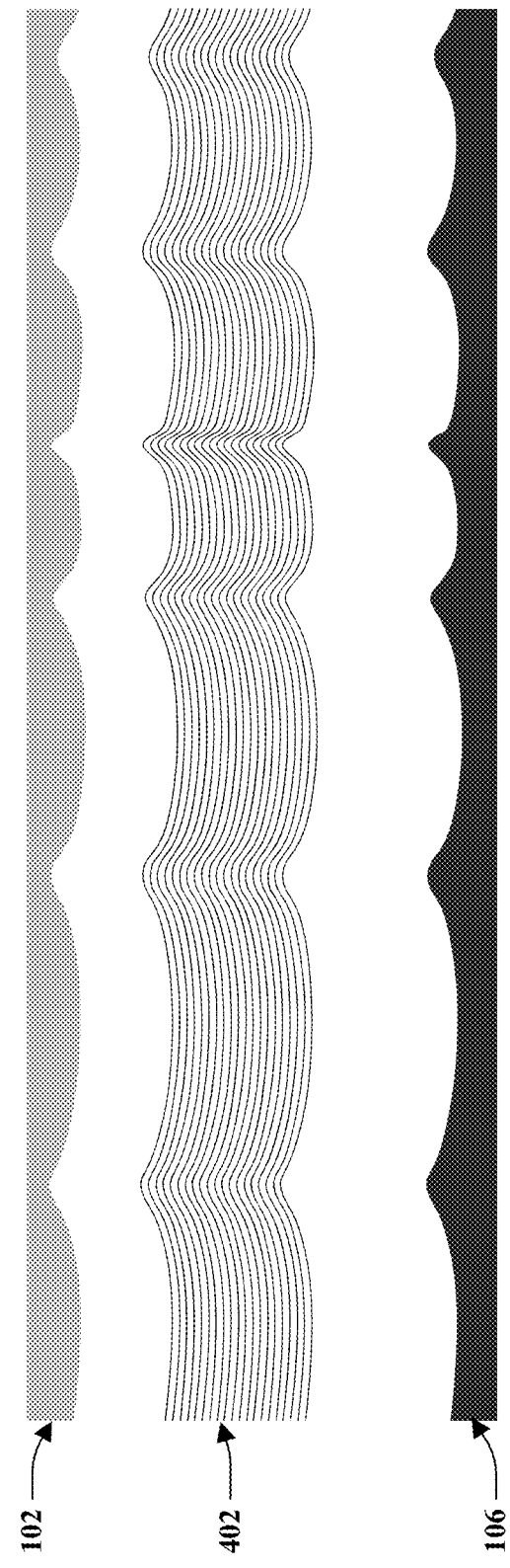
FIG. 4 is a component diagram illustrating an example implementation of a product resulting from one or more techniques and systems described herein.

FIG. 4 is a component diagram illustrating an example implementation of a product resulting from one or more techniques and systems described herein. In this example, a core fiber layer 402 can comprise a base component of the product. In one implementation, the core fiber layer 402 can comprise a plurality of layers of unidirectional fiber (e.g., carbon, aramid, etc.). In this implementation, the fiber core 402 can be molded into the 3D shape of the mold, under appropriate pressure and temperature. In one implementation, a silicone "male" side 102 is pressed against a hard "female" side 106 to shape the fiber core 402. In one implementation, the unidirectional fibers of the layers of the core 402 may be respectively aligned in parallel with each layer; alternately, the fibers of the layers of the core 402 may be aligned perpendicular to other layers in the core 402 (e.g., alternating).

Figure 5:
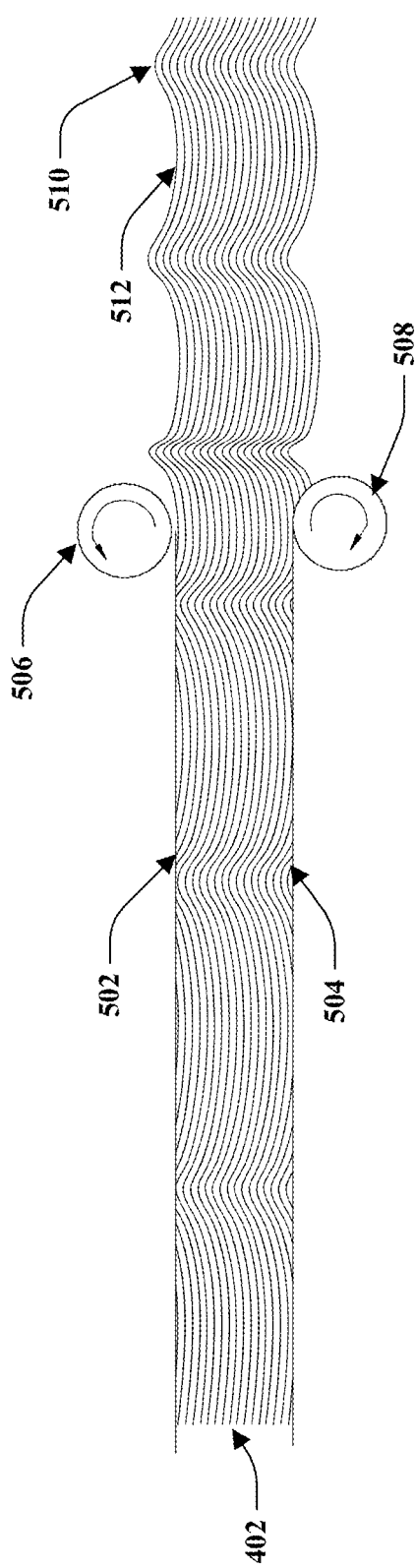
FIG. 5 is a component diagram illustrating an example implementation of a product resulting from one or more techniques and systems described herein.

FIG. 5 is a component diagram illustrating an example implementation of a product resulting from one or more techniques and systems described herein. In this implementation, the multi-layer fiber core 402 may comprise peaks 510 and valleys 512 as a result of the 3D molding process (e.g., "male" side 102 and "female" side 106). As an example, the peaks 510 and valleys 512 may be altered (e.g., flattened or leaving some desired texture) by machining or surfacing techniques (e.g., sanding, plaining, grinding, etc.) to provide a multi-layer fiber core 402 with a flat top surface 502 and a flat bottom surface 504 (e.g., or alternately with some desired texture). In this example, a first abrasive 506 may be in contact with the top of the multi-layer fiber core 402 to produce a substantially flat top surface 502, while a second abrasive 508 may be in contact with the bottom of the multi-layer fiber core 402 to produce a substantially flat bottom surface 504. In this example, the resulting core 402 may comprise a substantially flat multi-layer fiber core 402 that comprises a visual 3D appearance simulating a desired light-tracing characteristic of wood figure, for example.

Figure 6:
FIG. 6 is a component diagram illustrating an example implementation of a product resulting from one or more techniques and systems described herein.

FIG. 6 is a component diagram illustrating an example implementation of a product resulting from one or more techniques and systems described herein. In this example, at least one alternate material layer 604 may be interleaved between multiple layers of fiber 602, 606 to produce a desired visual appearance. The alternate material layer may be formed and molded as part of the multi-layer fiber core 402.

FIGS. 8-12 illustrate example implementations of one or more systems and products resulting from one or more techniques described herein. For example, these implementations show the resulting figured effect provided by the techniques described herein.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A method for panels with simulated wood figure, comprising:
   de-airing one or more resin pre-impregnated sheets of unidirectional, non-woven fiber material by placing the one or more sheets in a press, resulting in a substantially flat and malleable fiber core;
   molding the flat fiber core into a three-dimensional molded fiber core comprising valleys and ridges, the molding comprising subjecting the flat core to appropriate pressure and temperature, for an appropriate amount of time to cure the resin in a mold; and
   machining a face of the three-dimensional molded fiber core to remove portions of the valleys and ridges, resulting in a substantially flat faced panel exhibiting a simulated wood figure visual effect.

2. The method of claim 1, comprising one or more of:
   applying a clear resin to the in a face of the substantially flat faced panel to create a lensing effect of the fiber material; and
   applying a backing material to a rear face of the substantially flat faced panel to provide a substantially flat rear surface.

3. The method of claim 1, comprising stacking a plurality of the one or more pre-impregnated sheets of unidirectional, non-woven fiber material together such that a direction of the fibers in the respective sheets aligns in a parallel configuration.

4. The method of claim 1, the de-airing in the press comprising applying directional pressure from a central portion to a perimeter portion.

5. The method of claim 1, the de-airing in the press comprising compressing the one or more sheets using a pressure in the range of two-thousand-five hundred to three thousand-five hundred pounds per square foot.

6. The method of claim 5, comprising applying the pressure for an amount of time in the range of ten to thirty minutes.

7. The method of claim 5, comprising applying the pressure at a temperature in the range of seventy to ninety degrees Celsius.

8. The method of claim 1, the molding comprising applying a pressure to the flat fiber core in the range of two-thousand-five hundred to three thousand-five hundred pounds per square foot.

9. The method of claim 8, comprising applying the pressure for an amount of time in the range of sixty to one-hundred and fifty minutes.

10. The method of claim 8, comprising applying the pressure at a temperature in the range of one-hundred to one-hundred and eighty degrees Celsius.

11. The method of claim 1, comprising applying a clear resin over the machined face of the substantially flat faced panel to create a lensing effect of the wood figure.

* * * * *